(12) United States Patent
Baxter

(10) Patent No.: US 8,646,538 B2
(45) Date of Patent: Feb. 11, 2014

(54) METHODS FOR STABLE SEQUESTRATION OF CARBON DIOXIDE IN AN AQUIFER

(76) Inventor: Larry L. Baxter, Provo, UT (US)

( * ) Notice: Subject to any disclaimer, the term of this patent is extended or adjusted under 35 U.S.C. 154(b) by 0 days.

(21) Appl. No.: 12/875,947

(22) Filed: Sep. 3, 2010

(65) Prior Publication Data

US 2011/0056373 A1     Mar. 10, 2011

Related U.S. Application Data

(63) Continuation of application No. PCT/US2009/036089, filed on Mar. 4, 2009.

(60) Provisional application No. 61/068,129, filed on Mar. 4, 2008.

(51) Int. Cl.
    *E21B 43/16*     (2006.01)
(52) U.S. Cl.
    USPC .......................... 166/402; 96/108; 405/129.35
(58) Field of Classification Search
    USPC .................. 95/213; 166/402, 270; 60/671, 60/678–679, 710
    See application file for complete search history.

(56) References Cited

U.S. PATENT DOCUMENTS

| | | | |
|---|---|---|---|
| 4,664,809 A * | 5/1987 | Fenton et al. ............... | 210/663 |
| 6,170,264 B1 * | 1/2001 | Viteri et al. ................. | 60/671 |
| 6,214,607 B1 * | 4/2001 | Logan ......................... | 435/262.5 |
| 7,172,030 B2 * | 2/2007 | Horner et al. ............... | 166/402 |
| 2004/0200618 A1 | 10/2004 | Piekenbrock | |
| 2007/0261844 A1 | 11/2007 | Cogliandro | |
| 2010/0243248 A1* | 9/2010 | Golomb et al. ............. | 166/270 |

OTHER PUBLICATIONS

Saylor, B.Z. et al., "Injection and Trapping of Carbon Dioxide in Deep Saline Aquifers," Geological Society special publication, 2004, vol. 236, pp. 285-296.
Blunt, M.J. et al., "Streamline-Based Simulation of Carbon Dioxide Storage in a North Sea Aquifer,", Water Resources Research, 2006, vol. 42, No. 3, pp. WO3414.

* cited by examiner

*Primary Examiner* — Duane Smith
*Assistant Examiner* — Phillip Shao
(74) *Attorney, Agent, or Firm* — Workman Nydegger

(57) ABSTRACT

The methods disclosed herein relate to sequestering carbon dioxide in an aquifer by trapping the $CO_2$ in interstitial pores of the aquifer. Trapping the $CO_2$ in the interstitial pores of the aquifer prevents the sequestered $CO_2$ from escaping back to the surface and allows a much larger percentage of a $CO_2$ to be stably sequestered compared to techniques that rely on dissolving the $CO_2$ to achieve stable sequestration.

20 Claims, 2 Drawing Sheets

METHODS FOR STABLE SEQUESTRATION OF CARBON DIOXIDE IN AN AQUIFER

CROSS-REFERENCE TO RELATED APPLICATIONS

This application is a continuation of PCT Application serial number PCTUS2009/036089, entitled METHODS FOR STABLE SEQUESTRATION OF CARBON DIOXIDE IN AN AQUIFER filed Mar. 4, 2009, which claims the benefit of U.S. Provisional Application No. 61/068,129, filed on Mar. 4, 2008, entitled FOSSIL AND BIOMASS POWER SYSTEMS WITH STABLE CO2 SEQUESTRATION both of which are hereby incorporated herein by reference in their entirety

THE FIELD OF THE INVENTION

The present invention relates to methods for sequestering carbon dioxide in an aquifer.

THE RELEVANT TECHNOLOGY

The need to control $CO_2$ emissions on a global scale is widely recognized. Electric power generation plants, which combust fossil fuels to create power, provide an excellent opportunity to mitigate man-made $CO_2$ emissions. In North America, coal is the primary fuel used for electric power generation.

One of the control strategies proposed for $CO_2$ capture/sequestration involves concentrating the $CO_2$ contained in the boiler flue gas, followed by liquefaction of the $CO_2$. The liquid $CO_2$ can then be transported by pipeline to final storage sites, including the deep oceans, underground aquifers, depleted gas wells, and other, similar locations.

Several methods which have been proposed for capturing and concentrating $CO_2$ in flue gas include: absorption/stripping, semi-permeable membranes, substituting oxygen for combustion air and varying combinations of these approaches. In any of these cases, the $CO_2$ is typically liquefied and pumped to a final storage site.

One type of $CO_2$ sequestration under investigation is sequestration in an aquifer. $CO_2$ sequestration in an aquifer typically involves selecting a porous rock that has trapping layers (i.e., impervious rock layers) above and below the porous rock. A well is drilled through the upper trapping layer and into the aquifer. The $CO_2$ is injected below the trapping layer and fluid carbon dioxide accumulates in the upper portion of the aquifer below the trapping layer. Over time, the carbon dioxide dissolves into the aquifer. Selection of the geological feature to store $CO_2$ is difficult since it is essential to prevent the $CO_2$ from simply returning to the surface, which would negate the sequestration benefits sought and can actually pose a threat to life in the vicinity where the concentrated $CO_2$ escapes from the ground.

Direct injection of liquid $CO_2$ into the oceans has recently been considered. The concern with absorbing $CO_2$ into the ocean is that dissolved $CO_2$ is acidic and direct injection of $CO_2$ can cause local pH levels at the injection point to decrease significantly (e.g., to a pH less than 3.5), which is in contrast to normal seawater, which has a pH generally above 7.8.

Recent research has suggested that the absorption of $CO_2$ from power plant combustion gases directly into seawater can be made possible using limestone. In this process, flue gases is contacted with water and limestone using a modified $SO_2$ wet scrubber apparatus in conjunction with a porous carbonate bed and carbonic acid/water solution. Using this method, the absorption rate and capacity take advantage of relatively high partial pressure of $CO_2$ present in most flue gases.

This proposed method involves reacting $CO_2$ with mildly alkaline limestone, thereby buffering the pH. The minimum pH during $CO_2$ contact with water and limestone will be about 6.5. Once the $CO_2$ containing seawater is released into the ocean and returns to equilibrium with the open water, the pH will be above 7.8, while reducing the shock to the open water.

Unfortunately, there are several limiting factors for using the methods above. Foremost, the quantities and volumes of $CO_2$ that need to be processed preclude a practical configuration of any conventional wet scrubber apparatus. While simple injection of $CO_2$ into an aquifer has many advantages, the risks of the gas escaping back to the surface make it difficult to justify the expense unless extreme care is taken to ensure that resurfacing does not occur.

BRIEF SUMMARY

The methods disclosed herein relate to sequestering carbon dioxide in a geological formation such as an aquifer by trapping the $CO_2$ in interstitial pores of porous rock in addition to dissolution with the liquid. Trapping the $CO_2$ in the interstitial pores of the rock prevents the sequestered $CO_2$ from escaping back to the surface and allows a much larger percentage of a $CO_2$ to be stably sequestered compared to techniques that rely on dissolving the $CO_2$ in water to achieve stable sequestration. The method also stabilizes the $CO_2$ in the formation from the time of its injection.

In one embodiment, the method is carried out by injecting $CO_2$ into an aquifer that includes porous rock having interstitial pores. The aquifer is typically a saline aquifer due to low economic value of saline water. However, fresh water aquifers can also be used, though this may not be advisable because of the high-value alternative uses of fresh water. The methods include injecting a carbon dioxide stream (e.g., flue gas from a coal fired power plant) into the aquifer under conditions suitable for trapping greater than about 1.5% of the injected carbon dioxide into the interstitial pores of the porous rock of the aquifer. Conditions suitable for causing greater than about 1.5% of the $CO_2$ stream to enter the interstitial pores of the aquifer include injecting the $CO_2$ stream into a horizontal well and/or making the $CO_2$ stream laterally and horizontally dispersible in the aquifer at the point of injection such that the $CO_2$ diffuses from the point of injection.

Importantly, the $CO_2$ stream is injected into the aquifer in or below the porous rock and dispersed through the rock as the $CO_2$ stream rises to the top of the aquifer. The dispersed $CO_2$ must flow through the porous rock to reach the surface of the aquifer. As the $CO_2$ stream flows through the porous rock, a significant portion of the $CO_2$ is permanently trapped in the interstitial pores of the aquifer.

In one embodiment, lateral dispersion of the $CO_2$ stream into the water of the aquifer is achieved by drilling a horizontal well and injecting the $CO_2$ stream into the to horizontal well. Forming a horizontal well in a rock formation is known in the art of oil drilling. Horizontal drilling has been used in crude oil exploration to overcome problems in pumping oil, particularly viscous oils. (see e.g, U.S. Pat. No. 4,535,845, which is hereby incorporated herein by reference). As used in the methods disclosed herein, the horizontal well allows the $CO_2$ stream to be dispersed throughout the porous rock as it is injected into the aquifer, which causes the $CO_2$ stream to flow up through a significant percentage of the porous rock as compared to a vertical well.

In an alternative embodiment or in addition to horizontal well drilling, the $CO_2$ stream can be made dispersible in the water at the point of injection. Examples of method that can be used to make the $CO_2$ stream dispersible in the water at the point of injection include selecting a proper density for the $CO_2$ stream and/or preparing an emulsion of the $CO_2$ stream.

In one embodiment, the density of the $CO_2$ stream is selected by pumping a liquid $CO_2$ stream to a pressure sufficient to give the $CO_2$ stream a density that is about the same or greater than the density of the water at the point of injection. Selecting a density that is about the same or greater than the density of the water at the point of injection prevents the $CO_2$ stream from rapidly accumulating at the top of the aquifer. Because the $CO_2$ stream is dense, it will float at the level of injection and/or sink. Thus, as the $CO_2$ stream is continually or semi-continuously injected into the aquifer, the $CO_2$ stream diffuses laterally and horizontally. As the $CO_2$ flows through the porous rock, it becomes trapped in the interstitial pores. By selecting a density that is about the same or greater than the aquifer fluid density at the place of injection, the $CO_2$ stream can remain dispersible in the aquifer as it extends laterally until it flows into an interstitial pore, where it becomes permanently trapped or trapped until it dissolves in the surrounding fluid.

The majority of the $CO_2$ in the injected $CO_2$ stream is not dissolved in the water in to this system. The absorption of the $CO_2$ into the water is small because of the low solubility of $CO_2$ in water. Typically less than 0.1 vol % of an injected carbon dioxide stream will be dissolved in water immediately after injection. While some of the carbon dioxide may be dissolved in the water during the process described herein, a significant percentage of the carbon dioxide is sequestered in the interstitial pores of the aquifer. Trapping $CO_2$ in the interstitial pores of an aquifer allows a much larger percentage of the $CO_2$ stream to be stably sequestered in an aquifer compared to methods where the $CO_2$ is dissolved in the aquifer.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

I. Introduction

Figure 1:
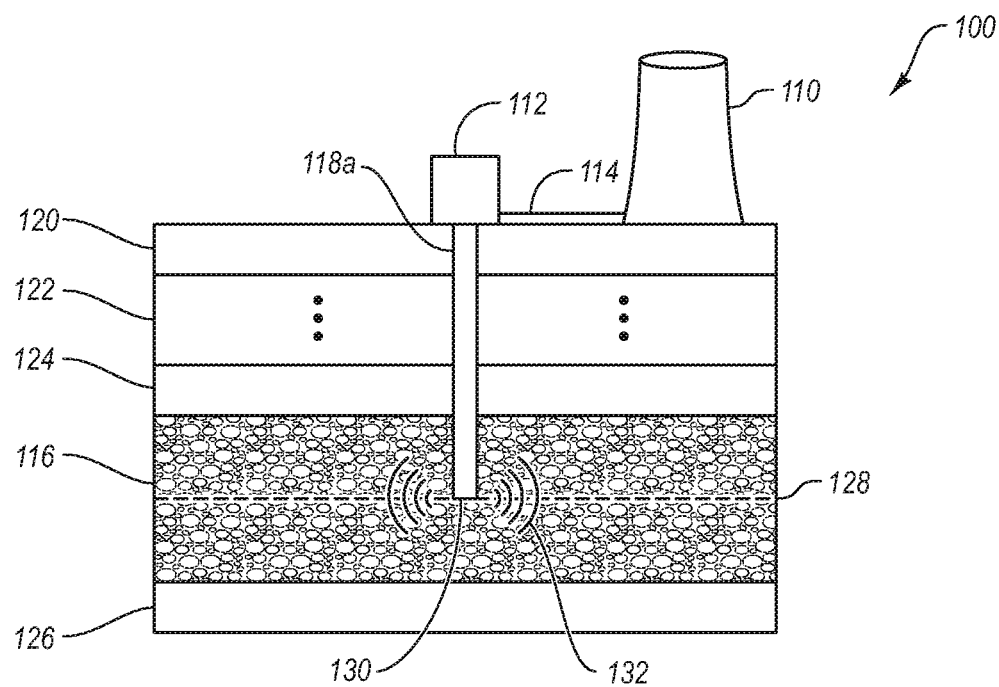
FIG. 1 illustrates an aquifer and system for sequestering carbon dioxide in the aquifer.

The methods disclosed herein relate to sequestering carbon dioxide in an aquifer by trapping the $CO_2$ in interstitial pores of the aquifer in addition to dissolving the $CO_2$ in the fluid. Trapping the $CO_2$ in the interstitial pores of the aquifer stabilizes the $CO_2$ from essential the time of injection, preventing the sequestered $CO_2$ from escaping back to the surface, and greatly increases the storage capacity of the aquifer compared to fluid dissolution alone.

For purposes of this invention, a "$CO_2$ stream" as used herein refers to a fluid with a substantially higher concentration (e.g., greater than 1.0 vol %) of carbon dioxide compared to "naturally existing" atmospheric air, which has less than about 0.04 vol % carbon dioxide. However, in most cases a much higher concentration of $CO_2$ is desired do avoid the expense associated with sequestering gases other than $CO_2$.

For purposes of the present invention, the term "horizontal well" refers to a well shaft that has a substantial arc (e.g., greater than 10 degrees) and therefore has at least a portion of the well shaft that is not vertical. Unless stated otherwise, the term "horizontal well" does not require a well shaft that is 90 degrees to vertical.

II. Providing an Aquifer

The aquifers used to sequester a carbon dioxide stream according to the methods described herein are geological formations in the earth. The aquifer includes porous rock and may include water and other fluids such as oil and/or natural gas. Water in the aquifer can include dissolved minerals such as salts. Typically the aquifer is a saline aquifer. Saline aquifers are plentiful and generally considered low-value since they are not readily usable for drinking water and/or agricultural purposes.

The aquifer includes a porous rock having macro pores that allow fluids such as water and gasses to flow through the rock. In addition, the porous rock includes interstitial pores. The interstitial pores are voids that can indefinitely trap gases flowing up through the rock. The interstitial pores have a geometry and a combination of surface wetting and surface tension properties that prevents the $CO_2$ from escaping them and rising vertically or, for that matter, horizontally in the reservoir. In one embodiment, at least a portion of the interstitial pores are sufficiently narrow to create capillary forces that cause the interstitial pore to become, "plugged" with fluid carbon dioxide. For example, at least a portion of the pore can have a diameter in a range from about 0.1 microns to about 20 microns. The amount of interstitial pore volume in the porous rock depends on the particular geological formation. Underground rock formations having interstitial pores that trap fluid are well known and have been extensively studied in the oil and gas industry.

Important features of the aquifer include its porosity, its permeability, its depth, and its thickness. In general, greater porosity, permeability, and thickness are desirable. In one embodiment, the thickness of the aquifer is in a range from about 1 to about 500 meters, more preferably about 15 meters to 100 meters. The porosity of the aquifer is preferably in a range from about 1% to about 25%, more preferably about 5% to about 20%. The permeability is preferably in a range from about 10 millidarcy to about 10 darcy, more preferably about 100 millidarcy to about 1 darcy. The depth can be in a range from about 500 meters to about 10 kilometers, more preferably about 1 km to 2 kms. The depth of the aquifer is selected in part to ensure that the $CO_2$ stream remains liquid in the aquifer as it diffuses horizontally. In a preferred embodiment, the fluid in the aquifer is at supercritical conditions for pure $CO_2$. Most aquifers suitable for $CO_2$ sequestration are at a depth and temperature that provides supercritical conditions for pure $CO_2$. The temperature of an aquifer can be in a range from 25° C. to 400° C. and the majority of saline aquifers are at a temperature in a range from 60° C. to 120° C. The temperature required for supercritical $CO_2$ is 31.03, which is below the temperature for most aquifers suitable for $CO_2$ sequestration.

The aquifer includes at least one well through which a carbon dioxide stream can be injected. The well can be formed using known drilling techniques. The well can be a vertical well or horizontal well. The advantages of using a horizontal well are discussed in more detail below with regarding to injecting the carbon dioxide stream into the aquifer.

The well can be drilled to any desired depth below the porous rock. The depth can vary between hundreds of feet to thousands of feet. The depth will depend on the location and formation of the geological structure, the layers of soil and rock to be drilled through, and the temperature and pressure of the aquifer at the location of injection, among other things. Deeper drilling generally increases the cost of drilling and injecting the carbon dioxide stream. It is possible to inject into several aquifers at different depths from a single well.

Any number of wells can be drilled into the aquifer. When numerous wells are formed in the same aquifer, the wells may be spaced apart to ensure maximum or optimal loading of $CO_2$ into the aquifer.

III. Providing a $CO_2$ Stream

The carbon dioxide stream can be a relatively pure stream of carbon dioxide or the carbon dioxide stream can include substantial quantities of other fluids such as water, nitrogen, or oxygen. In cases where the carbon dioxide stream includes a significant fraction of a fluid other than carbon dioxide, the preferred fluid is saline water, which is plentiful and relatively inexpensive to use. The carbon dioxide stream can also include impurities. However, it is often advantageous to remove substantially all or a significant portion of the impurities before injecting it into a natural environment.

The carbon dioxide stream includes a concentrated amount of carbon dioxide. Typically, the carbon dioxide stream is predominately $CO_2$. The concentration of $CO_2$ in the carbon dioxide stream can be at least about 50 weight percent $CO_2$, more preferably at least about 80%, even more preferably at least about 95%, and most preferably at least about 99 weight percent.

The carbon dioxide stream is preferably a supercritical carbon dioxide stream. Such carbon dioxide streams can be more easily and inexpensively injected and dispersed in the aquifer. Liquid carbon dioxide can be achieved by pressurizing carbon dioxide to a sufficient pressure at a given temperature above the triple point. For a pure carbon dioxide stream, the triple point is 518 kPa and −56.6° C. As temperature increases, the required pressure to achieve a liquid also increases. The critical point for $CO_2$ is 304.18 K (31.03° C.), 7.38 MPa, only slightly above nominal room temperature (25° C.) and well below most aquifer temperatures. Therefore, while $CO_2$ may be a liquid at the top of the well, it will likely be a supercritical fluid at the point of injection.

A supercritical carbon dioxide stream can be advantageous for dispersing the carbon dioxide stream in an aquifer. Supercritical fluids can diffuse through solids like a gas and dissolve materials like a liquid. In addition, close to the critical point, small changes in pressure or temperature result in large changes in density, which allows the properties of the supercritical carbon dioxide stream to be tuned for injection into various different aquifers at various different depths and conditions. A description of systems and methods for obtaining a carbon dioxide stream under supercritical conditions is described below.

The carbon dioxide stream is typically obtained from the flue gas of a to hydrocarbon power plant such as a coal fired power plant. The sequestration of the carbon dioxide according to the methods of the invention mitigates the release of green-house gasses from the power plant. Where the flue gas is derived from burning a bio fuel or cofiring such fuel with coal, the process of the invention combined with a $CO_2$ process can achieve a net decrease in atmospheric $CO_2$ concentrations.

In one embodiment of the invention, a desirably pure, pressurized $CO_2$ stream is obtained from stationary power plant flue gas. Any separation technique that can provide relatively pure $CO_2$ or a mixture of fluids that can be injected into an aquifer can be used with the present invention. In a preferred embodiment, the $CO_2$ stream is produced using a cryogenic process that separates the carbon dioxide from the nitrogen. Cryogenic separation techniques used to separate the carbon dioxide stream are preferred because the separation technique often involves obtaining a carbon dioxide stream that is liquid and under high pressure, which can be advantageous for injecting the carbon dioxide stream into an aquifer.

In a preferred embodiment, the carbon dioxide stream is obtained from a single pass flue gas, which therefore includes a significant or even a majority of nitrogen. Cryogenic techniques are used to compress and cool the flue gas to yield condensed carbon dioxide from the flue gas stream. The condensed carbon dioxide is separated from the gaseous nitrogen or other light gases at least in part based on the phase difference of the condensed carbon dioxide and the gaseous nitrogen. The methods and systems are made economical in part by using the cooled separated light gases (e.g., nitrogen) to cool the flue gases. In this manner a portion of the energy needed to cool the flue gas is recovered. In this embodiment, energy efficiencies and cost effectiveness can be achieved by condensing impurities in a heat exchanger upstream from the condensing of the carbon dioxide and separating the impurities from the carbon dioxide. By removing the impurities upstream from the condensed carbon dioxide, an essentially pure, solid-phase $CO_2$ phase can be obtained that does not need to be distilled or purified using other costly purification steps, thus dramatically reducing operating and capital costs. Finally, $CO_2$ compression can be performed on the condensed-phase $CO_2$ stream, which is more energy efficient compared to the operating and capital cost of compressing gaseous $CO_2$ to a liquid for injection into the aquifer. In one embodiment, the impurities that are extracted via condensation prior to condensation of the carbon dioxide include, but are not limited to $SO_2$, $NO_2$, HCl, and/or Hg. Because the flue gas is being compressed and cooled to condense carbon dioxide, the condensation and removal of these and other impurities is highly economical. Depending on flue gas moisture content, these impurities will form acids, liquids, or solids and can be separated from the remaining flue gas based on these differences in phase.

In one embodiment, the power required for compression of the carbon dioxide stream is derived from either a power plant or a grid-connected intermittent source or a cyclical source (such as, but not limited to windmills or excess power plant capacity at off-peak times) or a combination. Essentially all grid systems involve daily power demand cycles with large differences from peak to low points. The sequestration process can be carried out during low peak demand to optimize use of existing power generating potential. In one embodiment, the carbon dioxide stream can be stored in a vessel and then compressed during off-peak hours. The energy storage increases profitability and the efficiency of the system, thereby making the system more economical and competitive with current systems.

Other well-documented embodiments for obtaining a pure $CO_2$ stream include firing combustors or gasifiers with oxygen (oxyfiring), absorbing $CO_2$ with a solvent followed by stripping the $CO_2$ from the solvent to produce a pure stream, and reacting fuels and oxidizers in separate containers with an agent moving between them that alternatively oxidizes and reduces (chemical looping).

IV. Injecting the $CO_2$ Stream

The $CO_2$ stream is injected into the aquifer using any of several techniques that will ensure that the $CO_2$ stream is interspersed throughout the geological formation (i.e., the aquifer). In general, injected $CO_2$ tends to rise to the surface of an aquifer. In the case where the $CO_2$ stream is gaseous or supercritical fluid with a low density, the rise to the surface begins almost immediately upon injecting the $CO_2$ into the aquifer due to the lower density of the $CO_2$. The present invention includes injecting the $CO_2$ stream through horizontal wells to provide inter-dispersed fluid $CO_2$. In some embodiments of the invention, the $CO_2$ stream can be injected as a dispersible fluid. Using a dispersible $CO_2$ stream allows the $CO_2$ to disperse laterally from the point of injection before it forms bubbles and rises to the surface.

FIG. 1 illustrates a system 100 for injecting a $CO_2$ stream into an aquifer according to one embodiment of the invention. The system includes a source of carbon dioxide stream such as power plant 110 and an injection system 112 for pumping the carbon dioxide stream for injection into aquifer 116. A conduit 114 delivers flue gas from source 110 to injection system 112. Injection system 112 can include, pumps, heat exchangers, filters, separators, heaters, conduit, etc, for preparing a $CO_2$ stream for injection into the aquifer. A specific system is described below with respect to FIG. 3. However, the present invention is not limited to such a system.

As illustrated in FIG. 1, well 118a traverses several layers of soil in the ground. Well 118a passes through a layer of top soil 120 and any number of additional layers 122. Aquifer 116 typically has an upper layer 124 of nonporous rock and a lower layer 126 of nonporous rock. The upper and lower layers 124 and 126 provide an enclosure for the void spaces in the porous rock, thereby creating aquifer 116. The additional layers 122 can include porous and/or non-porous rock of almost any kind. Additional layers 122 can even include other aquifers such as fresh water aquifers and/or oil and gas deposits.

The depth of aquifer 116 below the surface of ground layer 120 will vary from location to location. The selection of the aquifer typically entails considering the depth of the aquifer, the distance from the source 110 of the $CO_2$ stream, and the hardness and number of additional layers above the aquifer. In general, deeper, harder, and more remote layers are more costly, and thus less desirable, all other considerations being equal.

The $CO_2$ stream is pressurized by system 112 and injected into aquifer 116 through well 118a. The injection can be continuous or semicontinuous. However, continuous injection is preferred to achieve relatively good diffusion of the $CO_2$ stream.

Well 118a can be created using techniques known in the art. Embodiments of the invention are directed to injecting the $CO_2$ stream into aquifer 116 under conditions suitable for trapping a significant quantity of the $CO_2$ stream in the interstitial pores of the aquifer. This is in contrast to attempts in the prior art to trap $CO_2$ in an aquifer by holding the injected $CO_2$ beneath the non-porous top layer 124. The integrity of non-porous top layer 124 is less important in the methods of the invention because the fluid $CO_2$ is permanently trapped throughout the porous rock of aquifer 116 (e.g., in the interstitial pores).

The aquifer pores permanently trap the $CO_2$ so long as the interstitial gas saturation is not exceeded. The interstitial gas saturation defines an amount of gas (typically varying from 10-20% by volume) that the reservoir indefinitely stabilizes in the pores and interstitial voids of aquifer solids with no long-term possibility of gas movement or accumulation. An additional amount remains dissolved in the water. The amount of water used in the process depends on the combination of the pore-stabilized and fluid-dissolved fractions—properties that are reservoir dependent. In some embodiments, injection and extraction wells separated by about 14 miles with 3 mile-long well lengths can store the effluent of a nominal 500 $MW_e$ power plant over its nominal 40 year operation (assuming a 100 feet thick aquifer, 1 Darcy permeability, and 20% porosity).

In a preferred embodiment, the $CO_2$ stream is injected into the aquifer under conditions suitable for trapping at least about 1.5 vol % of the $CO_2$ stream in the interstitial pores of the aquifer. Alternatively at least about 5 vol %, 20 vol %, 50 vol %, 75 vol % or even 90 vol % of the $CO_2$ stream can be trapped in the interstitial pores of the aquifer. Conditions suitable for trapping the foregoing vol % of $CO_2$ from the $CO_2$ include conditions where the injection results in $CO_2$ dispersed throughout the aquifer before it rises to the surface. Two conditions that facilitate achieving laterally dispersed $CO_2$ in the aquifer include, but are not limited to, horizontal well drilling and forming a dispersible $CO_2$ stream that is dispersible at the place of injection into the aquifer. Horizontal well drilling and laterally dispersible $CO_2$ streams can be used alone or in combination to achieve desired sequestration of the $CO_2$ stream.

A. Dispersing the $CO_2$ Stream in the Fluids of the Aquifer

A laterally dispersible $CO_2$ stream is a liquid $CO_2$ stream that can be injected into the fluids of the aquifer and, from the pressure of the injection, be diffused laterally for a substantial distance without the $CO_2$ effervescing or quickly rising toward the surface of the aquifer. The $CO_2$ stream can be made laterally dispersible by increasing the density of the $CO_2$ stream.

The conditions necessary to laterally disperse the $CO_2$ stream will depend on the to conditions of the aquifer at the location of injection. In general, lateral diffusion of the $CO_2$ stream can be accomplished by preventing the $CO_2$ stream from rising rapidly before it has diffused laterally. Generally such cases require that the densities of the $CO_2$ and aquifer water are similar and that the fluid is driven by the overpressure (pressure in excess of the static pressure of the aquifer) from the injection well.

Density can have a large effect on the time it takes for a $CO_2$ stream to rise.

Although there are several factors such as temperature and pressure that can affect the dispersability of the $CO_2$ stream in the aquifer, in general, the greater the density, the slower the $CO_2$ rises in the aquifer. If the $CO_2$ density exceeds that of the local fluid, which is possible at high pressures, the $CO_2$ stream will fall rather than rise in the aquifer. A $CO_2$ stream that sinks or stays at about the same depth as the injection location can be convectively dispersed in the lateral direction by the over-pressure of a continuously injected $CO_2$ stream.

In addition, the $CO_2$ stream increases in concentration rapidly, which creates a concentration gradient. Diffusion away from the location of injection continually forces the $CO_2$ stream further away from the location of injection. Near the injection location, the high $CO_2$ stream pressure provides favorable conditions for maintaining the $CO_2$ stream density high, which further facilitates lateral dispersion of the $CO_2$ stream.

FIG. 1 illustrates a $CO_2$ stream injected as a laterally dispersible fluid. Well 118a extends to a depth of injection 128. The $CO_2$ stream is injected into aquifer 116 at location 130 and the $CO_2$ stream radiates laterally in aquifer 116 as indicated by wave lines 132.

The lateral diffusion is achieved in the period of time between injection cessation of injection, presumably because the power plant is decommissioned or otherwise rendered inoperable. The extent of lateral dispersion depends on injection pattern, pressure, rock porosity, rock permeability, and other well-documented but complex properties of reservoir flow.

In one embodiment, the laterally diffusible $CO_2$ stream has a density that is approximately the same as the density of the fluid in the aquifer. Slightly higher $CO_2$ densities cause the $CO_2$ plume to drop while slightly lower $CO_2$ density cause the $CO_2$ stream to rise. Both dropping and rising plumes can be used effectively to help disperse the $CO_2$ evenly in the aquifer.

In one embodiment, the density of the $CO_2$ stream at the location of injection has a density that differs from the static pressure of the aquifer by less than about 200 $kg/m^3$, alternatively less than about 100 $kg/m^3$, less than about 50 $kg/m^3$, less than about 20 $kg/m^3$, less than about 10 $kg/m^3$, less than about 10 $kg/m^3$, or even less than about 1 $kg/m^3$. Typically, the density of the carbon dioxide stream is in a range from about 400 $kg/m^3$ to about 1100 $kg/m^3$. In another embodiment, the density ratio of aquifer fluids density/$CO_2$ stream density is less than 2.0, more preferably less than 1.5, and most preferably less than 1.2. In some embodiments it can be desirable for the density ratio to be less than 1 (i.e, the $CO_2$ stream is more dense than the static aquifer fluids at the level of injection).

The lateral diffusion can also be influenced by the overpressure of the $CO_2$ Stream (i.e., the difference between the pressure at the point of injection and the static pressure of the aquifer at the level of injection). In one embodiment, the overpressure of the injected $CO_2$ stream is selected to be at least about 150-500 atmospheres greater than a static pressure of the aquifer at the depth of injection, more preferably at least about 200-400 atmospheres greater.

In another embodiment, the $CO_2$ dispersion is controlled by injection pattern. For example, $CO_2$ densities less than that of the aquifer will be injected through one or more horizontal wells near the reservoir bottom and $CO_2$ will be trapped in pores as it rises through the reservoir.

In a third embodiment, $CO_2$ is dissolved in supercritical water and injected in this form in the aquifer in a manner that causes dispersion to be as uniform as possible, with gases trapped as the supercritical fluid cools and bubbles come out of solution. Supercritical water forms at about 647 K and 22.064 MPa. Aquifers that have supercritical water conditions are highly advantageous for this embodiment since they provide rapid dispersion of the injected stream.

Selecting the proper density for the $CO_2$ stream is typically achieved by calculating and/or measuring the density of the aquifer at the location where the $CO_2$ stream is to be injected and by considering the over-pressurization of the injection process. Since density is highly dependent on depth and on injection pressure, the density of the $CO_2$ stream can be adjusted for injection at different depths within the aquifer. Typically, the density is achieved by pumping a liquid $CO_2$ stream to a desired pressure using a pump. In one embodiment, the injection pressure of the $CO_2$ stream is in a range from about 50 to about 500 bar, more preferably in a range from about 100 to about 400 bar and most preferably about 200 to about 300 bar.

In another embodiment, a laterally dispersible $CO_2$ stream is achieved by making an emulsion of $CO_2$ that is dispersible in water. The emulsion can be achieved by using a surfactant including, but not limited to, micelle-forming organic chemicals such as soaps and similar compounds.

In yet another embodiment of the invention, the $CO_2$ stream can be made laterally dispersible in the fluids of the aquifer by forming a supercritical $CO_2$ stream. Supercritical carbon dioxide alone or with water can flow like a fluid and can also to dissolve like a solvent. Thus, a supercritical $CO_2$ stream can flow through the aquifer until pressure and temperature changes cause the supercritical $CO_2$ stream to lose supercritical properties. To form a supercritical fluid, the $CO_2$ stream is pressurized to the required pressure at a given temperature to obtain supercritical conditions. The lowest pressure and temperature is the critical point, which for pure $CO_2$ is 304.18 K (31.03° C.), 7.38 MPa and for pure water is 647 K and 22.064 MPa. The mixture will form a supercritical phase at pressures and temperatures above the highest of these values, which in the case of pure $CO_2$ and pure water means above the critical pressure and temperature of water. Other temperatures and pressures can be used so long as the desired supercritical phase is maintained.

B. Horizontal Well Drilling

In one embodiment, a $CO_2$ stream is injected into an aquifer in a dispersed manner using horizontal well drilling technology. A horizontal well can be formed in an aquifer in a similar manner as a vertical well except that a portion of the horizontal well forms an angle with a vertical portion of the well. The horizontal portion of the well allows the $CO_2$ stream to be injected into the well laterally from the point where the well enters the aquifer. In a preferred embodiment, the non-vertical or horizontal portion of the horizontal well can have a plurality of outlets where a portion of the $CO_2$ stream can be injected into the aquifer. In this manner the injection of the $CO_2$ stream can be carried out so as to provide a physically dispersed $CO_2$ stream at the location of injection.

Figure 2:
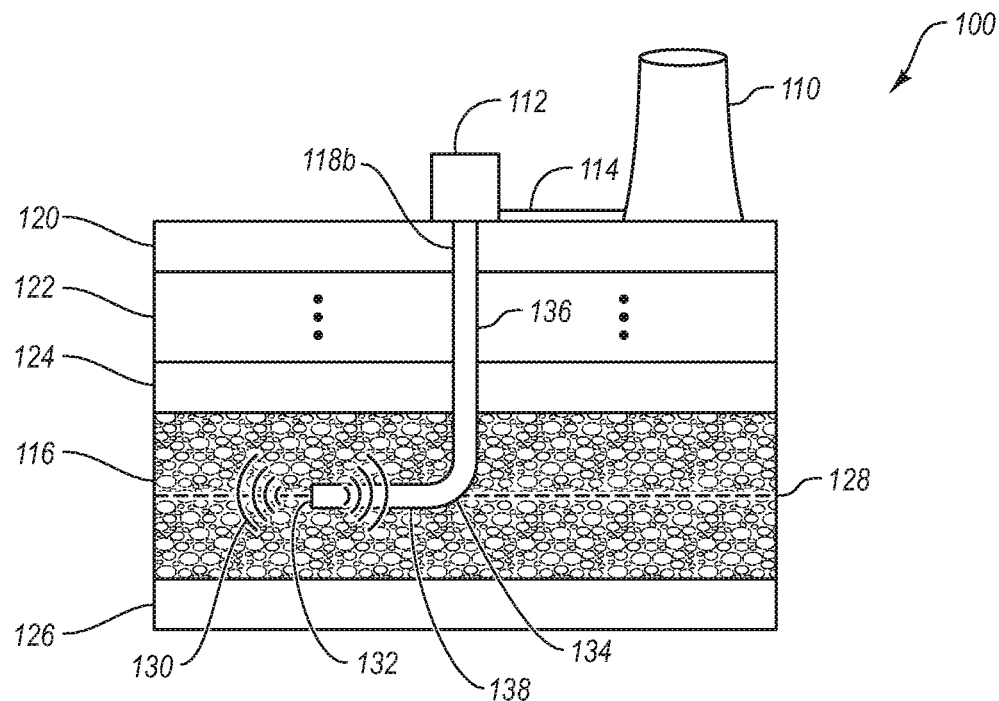
FIG. 2 illustrates an alternative embodiment of a system for sequestering carbon dioxide in an aquifer.

FIG. 2 illustrates a simple horizontal well configuration. Well 118b includes a substantially vertical portion 136 and a horizontal portion 138 that is joined through an arc 134. Typically vertical portion 136 is at about 90 degrees to the surface of ground layer 120; however, if desired, vertical portion 136 can be at an angle other than 90 degrees. Horizontal portion 138 is at an angle to vertical portion 136 so as to create arc 134 and a lateral displacement of the point of injection 132 from vertical portion 136. In one embodiment, horizontal portion is greater than about 60 degrees from vertical (i.e., less than about 30 degrees from horizontal), more preferably greater than about 80 degrees from vertical, and most preferably substantially horizontal. Angles of substantially about 90 degrees from vertical are preferred so as to prevent the well from providing a conduit for fluid carbon dioxide from flowing back toward vertical portion 136.

Horizontal well 118b can be made using any technique known in the art for drilling horizontal wells. Typically horizontal well 118b can be made by first drilling vertical portion 136 using standard vertical drilling techniques. When the desired depth is reached, the arc portion 134 can be formed using techniques such as steerable downhole motors, bent subs, pipe stabilizers and/or similar techniques. The horizontal portion 138 can be drilled to lengths from 100 meters to 3000 meters.

Horizontal well drilling can be used alone or in combination with any of the dispersing techniques described above. Horizontal well drilling can provide multiple injection locations in a lateral direction from a single well head. Thus, horizontal well drilling can be advantageous for method that employ techniques for diffusing the $CO_2$ stream through the fluid of the aquifer. However, for fluid $CO_2$ streams that are not laterally dispersible, horizontal well drilling is essential to provide an adequately dispersed $CO_2$ stream.

V. Example System for Obtaining Carbon Dioxide Stream

Figure 3:
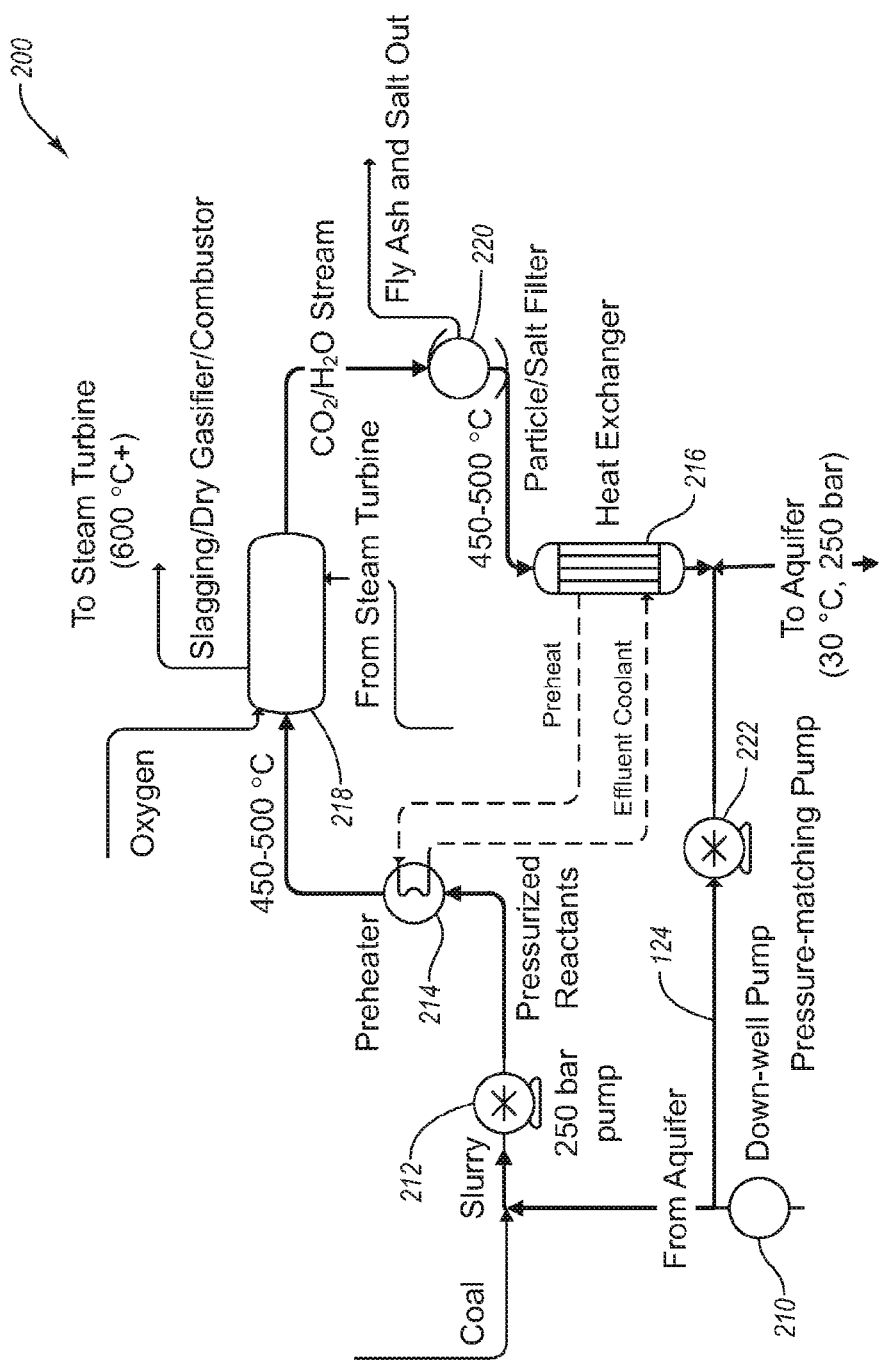
FIG. 3 illustrates a system for forming a $CO_2$ stream suitable for sequestration in an aquifer

A flow diagram for a method of obtaining a carbon dioxide stream is shown in FIG. 3. Following the flow through this diagram, the process extracts saline water from the aquifer (e.g., aquifer 116 shown in FIG. 1) using a down-well pump 210. The saline water is then mixed with a hydrocarbon fuel to form a slurry. Typically the fuel is coal, although the system can be used with other fuels. The slurry is then pressurized to a system operating pressure using a pump 212. An example of a suitable operating pressure is 250 bar, although lower or higher pressures can also be used. The slurry is then preheated in preheater 214 using waste heat from heat exchanger 216. The preheater 214 can heat the slurry to a temperature in a range from about 450-500° C. The preheated slurry is then combusted in the presence of oxygen in vessel 218, which can be a slagging/dry gasifier/combustor. Steam generated from the combustion of the slurried fuel is delivered to a steam turbine to generate power. The exhaust from the combustion includes $CO_2$, water, and impurities such as fly ash and salt. The fly ash, salt, and other solids are removed from the exhaust stream using separator/filter 220. The exhaust stream then passes through heat exchanger 216 to heat a coolant fluid, which is in turn used in preheater 214 as described above. The cleaned carbon dioxide stream can include about 10-90% mass fraction of $CO_2$. In one embodiment, a by-pass stream 124 and pressure matching pump 222 allow the concentration of the $CO_2$ in the injection stream to be reduced.

Alternatively, the supercritical fluid can be formed from the effluent of a traditional combustor when mixed with water from a reservoir and re-injected, not requiring the development of a slurry-fed pressurized supercritical water reactor. This system is largely similar to that of the previous embodiment, except that the reactor is replaced by a traditional combustor, the $CO_2$ is separated from the flue gas (or formed as pure $CO_2$ in the case of an oxygen-fired system), pressurized, and mixed with the water.

The foregoing systems can be used to generate a supercritical $CO_2$ stream. Supercritical $CO_2$ streams are advantageous for providing fine control regarding the density of the $CO_2$ stream to make the $CO_2$ dispersible in the aquifer.

The process can be carried out using fresh water or salt water. However, where salt water is used, the salt becomes insoluble in the water at a temperature above about 450° C., in which case, the salt precipitates on fly ash and exits the flow after the thermal converter. Anticorrosive materials can be used in the system to avoid the deleterious effects of having salt in contact with the system. Preferably, the salt is removed from the system as early as reasonable possible in the flow. In one embodiment, a portion of the clean reactor effluent water may be recirculated to mitigate the deleterious effects caused by the use of saline water.

As shown in FIG. 3, the mixture of dominantly $CO_2$ and water, with small amounts of sulfur- or nitrogen-containing impurities, returns to a nominally downstream portion of the aquifer at conditions of temperature, pressure, and $CO_2$ concentration that are indefinitely stable at the conditions of the aquifer. The aquifer pores permanently trap this gas so long as the interstitial gas saturation is not exceeded.

In one embodiment, the $CO_2$ stream is injected into an aquifer that includes crude oil hydrocarbons. The $CO_2$ stream can be injected into the aquifer at elevated temperatures and used to extract oil at efficient incremental costs due to the already elevated temperature of the $CO_2$ stream.

The present disclosure results in a stable $CO_2$ aquifer plume with little or no possibility of rapid release back to the surface. The systems and methods described herein can be relatively easily deployed since the aquifer size and fluid flow rates are within the range of existing reservoir management practices used in the oil and gas industries.

The present invention may be embodied in other specific forms without departing from its spirit or essential characteristics. The described embodiments are to be to considered in all respects only as illustrative and not restrictive. The scope of the invention is, therefore, indicated by the appended claims rather than by the foregoing description. All changes which come within the meaning and range of equivalency of the claims are to be embraced within their scope.

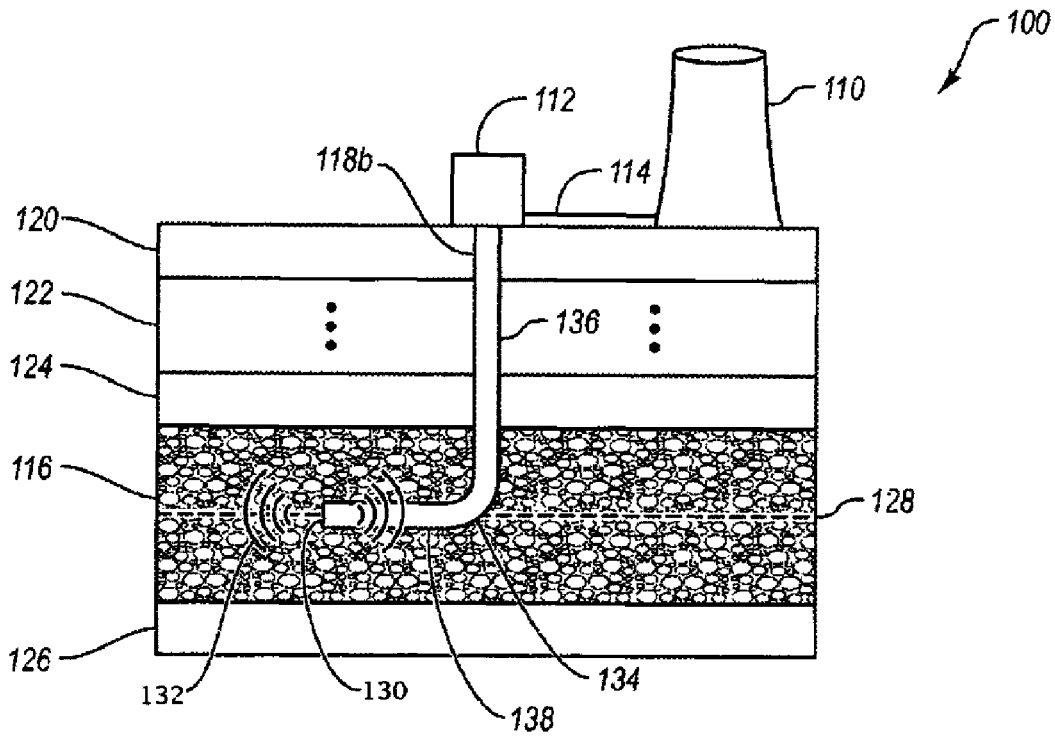

What is claimed is:

1. A method for sequestering carbon dioxide in an aquifer comprising:
    providing a carbon dioxide stream in which at least 50 weight % of the stream is carbon dioxide; providing an aquifer that includes water and porous rock, the porous rock having interstitial pores; injecting the carbon dioxide stream into the aquifer under conditions suitable for laterally dispersing the carbon dioxide so as to trap at least about 20 vol % of the injected carbon dioxide into the interstitial pores of the porous rock of the aquifer, wherein the lateral dispersion is created by injecting the carbon dioxide into a well and selecting a density and a point of injection wherein the ratio of densities of aquifer fluids/carbon dioxide stream is less than about 2, the overpressure of the carbon dioxide stream at the point of injection is from about 150-500 atmospheres, and wherein the lateral dispersion causes at least 20 vol % of the injected carbon dioxide to be trapped in the interstitial pores.

2. A method as in claim 1, wherein the carbon dioxide stream is injected into a horizontal well.

3. A method as in claim 1, wherein the carbon dioxide stream is injected into the aquifer as a liquid or a supercritical fluid.

4. A method as in claim 3, wherein the carbon dioxide stream is laterally dispersible in the interstitial pores at the location of injection.

5. A method as in claim 4, wherein the carbon dioxide stream is injected into the aquifer at a density that is about the same as the density of the water at the location of injection.

6. A method as in claim 4, wherein the carbon dioxide stream includes an emulsion of carbon dioxide that is dispersible in the water at the location of injection.

7. A method as in claim 1, wherein the density ratio of aquifer fluids/carbon dioxide stream is less than about 1.5.

8. A method as in claim 1, wherein at least about 50% of the carbon dioxide in the injected carbon dioxide stream is trapped in the interstitial pores.

9. A method for sequestering carbon dioxide in an aquifer, comprising:

providing a carbon dioxide stream;

providing an aquifer that includes water and porous rock, the porous rock having interstitial pores;

injecting the carbon dioxide stream into the aquifer, wherein the ratio of the density of the aquifer fluids/density of the injected carbon dioxide stream is less than about 2 at the point of injection, such that carbon dioxide diffuses laterally from the location of injection and at least 20 vol % of the carbon dioxide stream is trapped in the interstitial pores.

10. A method as in claim 9, wherein the ratio of the density of the aquifer fluids/density of the injected carbon dioxide stream is fro less than about 1.5 at the depth of injection.

11. A method as in claim 10, wherein at least about 50% of the injected carbon dioxide is trapped in the interstitial pores of the porous rock of the aquifer.

12. A method as in claim 9, wherein the carbon dioxide stream is a supercritical fluid.

13. A method for sequestering carbon dioxide, comprising:
providing a carbon dioxide stream in which at least 50 weight % of the stream is carbon dioxide;
providing a geological rock formation that includes porous rock, the porous rock having interstitial pores;
providing a horizontal well bored into the porous rock of the geological formation, the horizontal well including a first shaft portion that extends from above ground into the geological formation and a second shaft portion that extends from the first shaft at an angle thereto; and
horizontally injecting the carbon dioxide stream into the porous rock through the well, wherein the ratio of the density of the aquifer fluids/density of carbon dioxide stream is less than about 2.0 to cause at least 20 vol % of the injected carbon to be trapped in the interstitial pores.

14. A method as in claim 13, wherein at least one of the portions of the horizontal well is greater than 60 degrees from vertical.

15. A method as in claim 13, wherein at least about 50% of the injected carbon dioxide is trapped in the interstitial pores of the porous rock of the aquifer.

16. A method as in claim 13, wherein the carbon dioxide stream is a supercritical fluid.

17. A method as in claim 1, wherein the density ratio of aquifer fluids/carbon dioxide stream is less than about 1.2.

18. A method as in claim 1 wherein the overpressure of the injected carbon dioxide stream is from about 200-400 atmospheres.

19. A method as in claim 9, wherein the overpressure of the injected carbon dioxide stream is from about 150-500 atmospheres at the depth of injection.

20. A method as in claim 13, wherein the overpressure of the injected carbon dioxide stream is from about 150-500 atmospheres at the depth of injection.

* * * * *

UNITED STATES PATENT AND TRADEMARK OFFICE
CERTIFICATE OF CORRECTION

Page 1 of 3

PATENT NO.        : 8,646,538 B2
APPLICATION NO.   : 12/875947
DATED             : February 11, 2014
INVENTOR(S)       : Baxter It is certified that error appears in the above-identified patent and that said Letters Patent is hereby corrected as shown below:

The Title Page, showing an illustrative Figure, should be deleted and substitute therefor the attached Title Page.

On the Title Page, Item (76), change "Provo, UT" to --Orem, UT--

Drawings
Sheet 1, replace Figure 2 with the figure depicted below, wherein reference number 130 is replaced with 132 and reference number 132 is replaced with 130

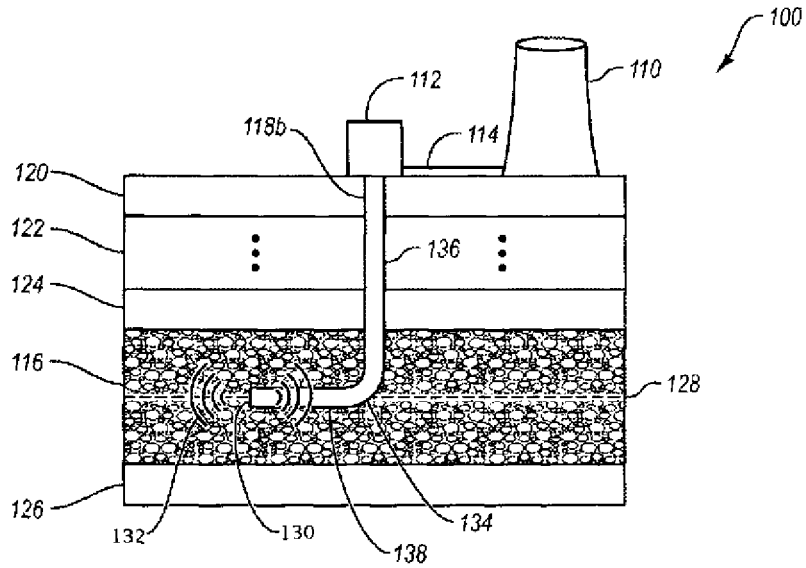

Fig. 2

Signed and Sealed this
Twelfth Day of August, 2014

Michelle K. Lee
*Deputy Director of the United States Patent and Trademark Office*

CERTIFICATE OF CORRECTION (continued)
U.S. Pat. No. 8,646,538 B2

In the Specification
Column 2
Line 60, change "into the to" to --into the--
Line 64, change "oils. (see" to --oils (see--

Column 3
Line 28, change "in to this system" to --in this system--

Column 4
Line 3, change "essential" to --essentially--
Line 12, change "is desired do" to --is desired to--
Line 42, change "to become, "plugged"" to --to become "plugged"--

Column 5
Line 11, change "regarding to" to --regard to--

Column 6
Line 5, change "of a to" to --of a--

Column 7
Line 37, change "etc," to --etc.,--

Column 8
Line 27, change "Alternatively at" to --Alternatively, at--
Line 49, change "on the to" to --on the--

Column 9
Line 24, change "density cause" to --densities cause--

Column 10
Line 53-54, change "point of injection 132" to --point of injection 130--

Column 11
Line 8, change "method that" to --methods that--
Line 64, change "reasonable possible" to --reasonably possible--

In the Claims
Column 13, Claim 10
Line 13, change "is fro less" to --is less--

(12) United States Patent
Baxter

(10) Patent No.: US 8,646,538 B2
(45) Date of Patent: Feb. 11, 2014

(54) METHODS FOR STABLE SEQUESTRATION OF CARBON DIOXIDE IN AN AQUIFER

(76) Inventor: Larry L. Baxter, Provo, UT (US)

(*) Notice: Subject to any disclaimer, the term of this patent is extended or adjusted under 35 U.S.C. 154(b) by 0 days.

(21) Appl. No.: 12/875,947

(22) Filed: Sep. 3, 2010

(65) Prior Publication Data
US 2011/0056373 A1 Mar. 10, 2011

Related U.S. Application Data

(63) Continuation of application No. PCT/US2009/036089, filed on Mar. 4, 2009.

(60) Provisional application No. 61/068,129, filed on Mar. 4, 2008.

(51) Int. Cl.
*E21B 43/16* (2006.01)

(52) U.S. Cl.
USPC .............. 166/402; 96/108; 405/129.35

(58) Field of Classification Search
USPC .............. 95/213; 166/402, 270; 60/671, 60/678–679, 710
See application file for complete search history.

(56) References Cited

U.S. PATENT DOCUMENTS

| | | | |
|---|---|---|---|
| 4,664,809 A * | 5/1987 | Fenton et al. | 210/663 |
| 6,170,264 B1 * | 1/2001 | Viteri et al. | 60/671 |
| 6,214,607 B1 * | 4/2001 | Logan | 435/262.5 |
| 7,172,030 B2 * | 2/2007 | Horner et al. | 166/402 |
| 2004/0200618 A1 | 10/2004 | Pickenbrock | |
| 2007/0261844 A1 | 11/2007 | Cogliandro | |
| 2010/0243248 A1 * | 9/2010 | Golomb et al. | 166/270 |

OTHER PUBLICATIONS

Saylor, B.Z. et al., "Injection and Trapping of Carbon Dioxide in Deep Saline Aquifers," Geological Society special publication, 2004, vol. 236, pp. 285-296.
Blunt, M.J. et al., "Streamline-Based Simulation of Carbon Dioxide Storage in a North Sea Aquifer,". Water Resources Research, 2006, vol. 42, No. 3, pp. W03414.

* cited by examiner

*Primary Examiner* — Duane Smith
*Assistant Examiner* — Phillip Shao
(74) *Attorney, Agent, or Firm* — Workman Nydegger

(57) ABSTRACT

The methods disclosed herein relate to sequestering carbon dioxide in an aquifer by trapping the $CO_2$ in interstitial pores of the aquifer. Trapping the $CO_2$ in the interstitial pores of the aquifer prevents the sequestered $CO_2$ from escaping back to the surface and allows a much larger percentage of a $CO_2$ to be stably sequestered compared to techniques that rely on dissolving the $CO_2$ to achieve stable sequestration.

20 Claims, 2 Drawing Sheets